United States Patent [19]
Borg

[11] Patent Number: 5,053,174
[45] Date of Patent: Oct. 1, 1991

[54] METHOD OF PRODUCING A SHRINKABLE PRODUCT

[75] Inventor: Tommi Borg, Evijarvi, Finland

[73] Assignee: Muolon Oy, Evijarvi, Finland

[21] Appl. No.: 399,501

[22] PCT Filed: Oct. 5, 1988

[86] PCT No.: PCT/FI88/00160
§ 371 Date: Sep. 27, 1989
§ 102(e) Date: Sep. 27, 1989

[87] PCT Pub. No.: WO89/03294
PCT Pub. Date: Apr. 20, 1989

[30] Foreign Application Priority Data
Oct. 12, 1987 [FI] Finland .................. 874485
Mar. 8, 1988 [FI] Finland .................. 881067

[51] Int. Cl.⁵ .................................. B29C 47/86
[52] U.S. Cl. .................. 264/146; 264/40.7; 264/209.4; 264/209.5; 264/211.21; 264/230; 264/235; 264/342 R; 425/378.1; 425/380; 425/461
[58] Field of Search ......... 264/145, 146, 176.1, 264/342 R, 567–568, 209.3–209.5, 230, 40.7, 211.21, 235; 425/461, 379.1, 378.1, 326.1, 380

[56] References Cited

U.S. PATENT DOCUMENTS

| | | | |
|---|---|---|---|
| 2,763,029 | 9/1956 | Tulloss, Jr. ............... | 264/567 |
| 3,142,865 | 8/1964 | Richie et al. .............. | 264/563 |
| 3,364,524 | 1/1968 | Hsia ....................... | 425/404 |
| 3,510,549 | 5/1970 | Tsuboshima et al. ......... | 264/209.5 |
| 3,803,304 | 4/1974 | Schirmer .................. | 264/342 R |
| 3,891,737 | 6/1975 | Marsh et al. .............. | 264/230 |
| 4,053,270 | 10/1977 | Collier et al. ............ | 425/379.1 |
| 4,156,709 | 5/1979 | Kondo et al. .............. | 264/230 |
| 4,189,293 | 2/1980 | Ether ..................... | 264/146 |
| 4,443,399 | 4/1984 | Takashige et al. .......... | 264/146 |
| 4,814,135 | 3/1989 | Heitz ..................... | 264/230 |

FOREIGN PATENT DOCUMENTS

| | | | |
|---|---|---|---|
| 0151343 | 8/1985 | European Pat. Off. ....... | 264/176.1 |
| 1479904 | 6/1969 | Fed. Rep. of Germany . | |
| 1504291 | 10/1969 | Fed. Rep. of Germany . | |
| 61-143125 | 6/1986 | Japan . | |
| 63-77728 | 4/1988 | Japan .................... | 264/146 |
| 1000841 | 8/1965 | United Kingdom .......... | 264/146 |

OTHER PUBLICATIONS

"Extrusion of Highly Oriented Polyolefin Fibers", *Polymer Engineering and Science*, vol. 16, No. 3, Mar. 1976, by J. Collier et al., pp. 204–211.

*Primary Examiner*—Jeffery Thurlow
*Attorney, Agent, or Firm*—Young & Thompson

[57] ABSTRACT

The invention relates to a method for the production of a shrinkable product of a thermoplastic raw material by extrusion. The raw material (1) is extruded through a die (3) to form a pipe (18), whereafter the pipe is cut longitudinally in a cutter (7), spread out, and wound on to a reel (19, 17). The production rate is low and rapid cooling is carried out in a calibration gauge (4). When reheated, a bandlike product (9) thereby shrinks vigorously and is welded to the object in question.

15 Claims, 3 Drawing Sheets

METHOD OF PRODUCING A SHRINKABLE PRODUCT

The invention relates to a method of producing a shrinkable product of a thermoplastic raw material by extrusion.

Products produced by this method have a great variety of uses. Depending on the requirements in each particular case, the products may be sheetlike, bandlike or tubular in shape. Possible uses include finishing cable ends in electric installations, extending protective sheathings of district heating pipes, applying protective coating to large iron pipelines, providing sockets in polyethene pipes, joining iron, concrete or PVC pipes, binding of packages, and insulation and sealing in air conditioning techniques. Other applications of the invention are also possible.

To begin with, the associated prior art will be discussed from different points of view.

In cases where the product is intended for use in the form of a sheet or a band, it is customary to produce it directly into the desired shape by means of a flat die. In prior production methods, however, the final product has had undesired properties, such as variation in thickness, indefinite stresses, etc.

As a consequence, sheetlike products have been produced by first extruding the raw material into a pipe by means of an annular die, whereafter the pipe is cut open and spread out. Such applications are disclosed e.g. in Finnish Patent Specifications 25 288 and 45 014. Especially with regard to the latter one, which describes the method in more detail, it should be noted that the object is to produce unshrinkable products.

Such products are not suited for the uses described above. On the other hand, attempts have been made to utilize a similar method in the production of shrinkable bands or the like products, too.

Such methods are disclosed e.g. in Swedish Published Specification 335 081 and Finnish Patent Application 842837. Firstly, these solutions are rather complicated in the process-technical sense. For obtaining the desired end result, the raw material has to be cross-linked and, further, a laminate of two or more layers has to be formed before the product is usable. These measures themselves cause considerable costs and require expensive apparatus investments. In addition, the use of products produced by these methods is difficult as well as time-consuming. Products of this kind are marketed in Finland under the product names NEO COVER or RAYCHEM, too.

The object of the present invention is to provide a method which avoids the above-mentioned drawbacks and enables a simple production of a versatile product which is easy to use. This object is achieved by means of the method according to the invention which is characterized by the steps of extruding the plastic raw material during extrusion through a die at a low speed in such a manner that the flow remains laminar, thus obtaining a longitudinal orientation of the molecules, and rapidly cooling the plastic material after extrusion so that the longitudinal orientation of the molecules is maintained in a solidified state in the finished product.

The basic idea of the invention is that, surprisingly enough, it is possible to utilize the properties and behaviour of a thermoplastic raw material in conventional production methods utilizing a screw extruder comprising, alternatively, an annular or flat die. The die, however, differs slightly from the one used in the traditional production technique.

The die is adjusted in such way that the flow path of the raw material is as long as possible and the die slot is narrow. Furthermore, the production rate is kept at a lower level than usually, so that the flow remains laminar. It is also to be preferred that the molecular speed is kept as close to zero as possible along the die walls, whereby the raw material retains its adhesion to the walls. For improving the adhesion, the temperature of the terminal portion of the die is preferably kept at a level as low as possible. The molecules are thus straightened and oriented in the longitudinal direction. This results in that the material becomes anisotropic, i.e., certain properties are different in different directions. These properties are concerned with shrinking, which is essential in the product obtained by the method according to the invention. In other words, shrinking is vigorous in the longitudinal direction while it is insignificant in the transverse direction.

The above applies generally both to annular and flat dies. In the following discussion on the process steps after extrusion, the annular die will be discussed first.

In pipe production a subsequent step after extrusion is calibration. A conventional pipe production technique utilizes a gradual cooling carried out step by step. Contrary to this, the present method utilizes rapid cooling. In this way the above-mentioned longitudinal orientation of molecules is maintained in the product obtained, whereby a so called thermal history remains in the product. This means that when the product is reheated a vigorous longitudinal shrinking takes place, i.e., an elastic recovery. The longitudinal shrinking ratio can be affected by stretching prior to rapid cooling.

At this stage the product is still tubular in shape. It can be used as such for the above-mentioned purposes. The tubular product is passed on an object and is heated so that it shrinks while its diameter is decreased, and it is welded around the object.

Furthermore, the pipe can be cut in the longitudinal direction after calibration for obtaining a sheet or a band, whereafter it is wound on a reel via a receiving means. As is apparent from the above, transverse stresses remain in a sheetlike product to some extent. These can be eliminated to such an extent as desired by heat treatment, annealing. It should be noted herein that subsequent stress removal at the production stage does not have any effects in the longitudinal direction, because the longitudinal and transverse stresses have been created at different stages. At the calibration stage, the transverse stresses can also be affected by the blow ratio, i.e., the ratio between the diameters of the die and the calibration gauge.

The product produced as described above thus has the shape of a sheet or a band and it is wrapped around an object, so that it shrinks vigorously in the longitudinal direction when heated and is welded together with the object. The weldability is also due to the fact that no cross-linking is carried out, whereas previously this has been regarded as necessary in the production of similar products, e.g. by means of catalytic agents or radiation.

Most of the above also applies to production carried out by a flat die. The most important differences are that the possible stretching after the die is omitted and that no stress removal is required since no major transverse stresses remain in the product when it is produced directly in the form of a sheet or a band.

As to the desired properties of the product to be produced, it has been found that the raw material, such as HDPE, has critical properties (i.e. properties affecting the elastic deformation) such as a high molecular weight, broad molecular distribution, low melt viscosity and low density (these properties are dealt with e.g. in a BASF product brochure LUPOLEN®, 1986). With a steady flow, the elastic deformation can be anticipated and this can be illustrated e.g. by means of the following equations (Physics of Plastics, The Plastics Institute, London, 1965, p. 272-282).

$$J = \frac{2M}{5cRT} \quad (1)$$

wherein
J = steady flow compliance, i.e., "recoverable deformation"
M = molecular weight
c = concentration, i.e., density
R = rate of shear
T = temperature
On the other hand $$J = \frac{I}{G} = \frac{2M}{5cRT} \quad (2)$$

wherein
G = elastic shear modulus, whereby the elastic shear strain gives $$\frac{S}{G} = \frac{2SM}{5cRT} \quad (3)$$

wherein
S = shear stress

It appears therefrom that in a steady flow the elastic strain increases with increasing molecular weight and shear strain and with decreasing temperature. With HDPE, the elastic shear modulus remains substantially unchanged within this particular operating temperature (Polymeëritiede ja muoviteknologia, Helsinki 1986, Part II, p. 248). When the stress is removed by heating the product when it is used, the molecules resume their original configuration.

In the following the method according to the invention will be described by means of examples with reference to the attached figures, wherein FIGS. 1A-1C illustrate sequential portions of an arrangement for an apparatus for applying the method when a tubular die is used;

Thermoplastic raw material (ethylene plastic HDPE, density 0.948 g/cm$^3$, melt viscosity descriptive of melt flow properties = 9 with a load of 21.6 kg, carbon black granulate concentration 1.5%) is usually purchased in granular form, i.e. as granulates.

Figure 1A:
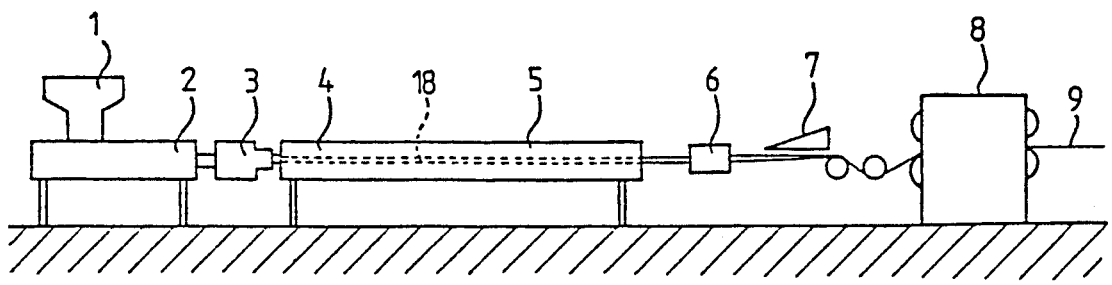

In FIG. 1A, the raw material 1 is introduced into a screw extruder 2 (speed of rotation of the screw r = 35/min; diameter D = 60 mm; L/D = 25; running temperature in the screw cylinder varies between 130° and 190° C. in a rising manner, temperature at the die preferably 170° C.), wherefrom the thoroughly plasticized molten plastic substance is extruded into a pipe through a conventional tubular die 3 (sleeve D = 51.7 mm; pin D = 48.5 mm), the obtained wall thickness being 1.6 mm, temperature 165° C.

The tubular profile is then calibrated by rapid cooling, so that the shape and outer diameter of the plastic pipe 18 are determined. An overpressure calibration is used in which a calibration device 4, i.e., a calibration gauge (overpressure = 0.5 bar, inner diameter = 65 mm, the blow ratio being 1.3) is in contact with the die 3. By means of the blow ratio, it is possible to affect the transverse deformation within the limits from −50% to +50%. The blow ratio in the calibration method used is preferably in the range from 0.7 to 1.5. With a draw ratio of 1.25 the wall thickness s = 1 mm. The shrinkage can be affected by stretching, represented by the above-mentioned draw ratio. In general, a greater wall thickness requires an increase draw ratio, which preferably ranges from 1 to 6 with this particular calibration technique. With these values, the production rate is about 30 kg/h. Water at 6° C. is used as a cooling medium in the calibration gauge and in a cooling basin 5. For improving the cooling effect, an antifreeze agent at −20° C., for instance, may be used. Depending on the wall thickness of the pipe, an internal cooling may be necessary. This can also be carried out by means of air or gas (cf. e.g. Finnish Patent Specification 56 789).

If the product is to be used in tubular form, the production can be interrupted at this stage. It has proved advantageous to use a rotating die, i.e., a die in which the sleeve and the pin are rotatable with respect to each other, in the production of tubular products. The sliding surfaces of the die seldom require additional lubrication because of the good lubricating properties of thermoplastics. Torsional stresses remain in the product to some extent, but these are not of any greater disadvantage in use.

Figure 1B:
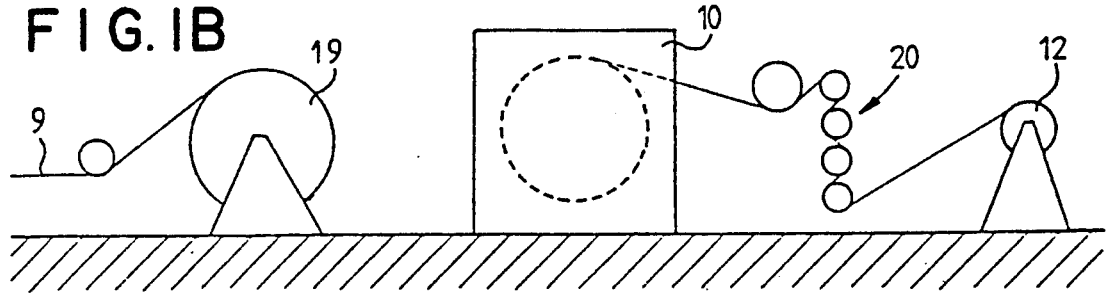

After calibration the pipe 18 is cut open in a cutter 6, whereafter it is made sheetlike by means of a spreader 7 before a drawing means 8. The product emerging from the drawing means in the form of a sheet 9 is wound on a reel (FIG. 1B) in such a way that the (lower) side of the sheet, originally the outer surface of the pipe, is turned towards the inside of the reel.

The wound semi-finished product is tempered in a furnace 10 for about two hours at 110° C. for removing the transverse stresses caused by the tubular form. From the furnace the sheetlike product is passed through cooling rolls 20 on to a user reel 12. For certain purposes it is of advantage that there are some transverse stresses in the final product to some extent. Therefore, the duration and temperature of the tempering process are adjusted for obtaining the desired end result or it may be fully omitted.

The product produced as described will shrink about 70% in the longitudinal direction and about 5% in the direction of the width thereof when it is heated in connection with its use for 10 minutes at about 170° C. The shrinking of the product causes it to be tightened around the object and welded together therewith in a "gluelike" manner. An important factor with regard to the weldability is that cross-linking, which limits the mobility of the molecular structure of the material, is not carried out.

Figure 1C:
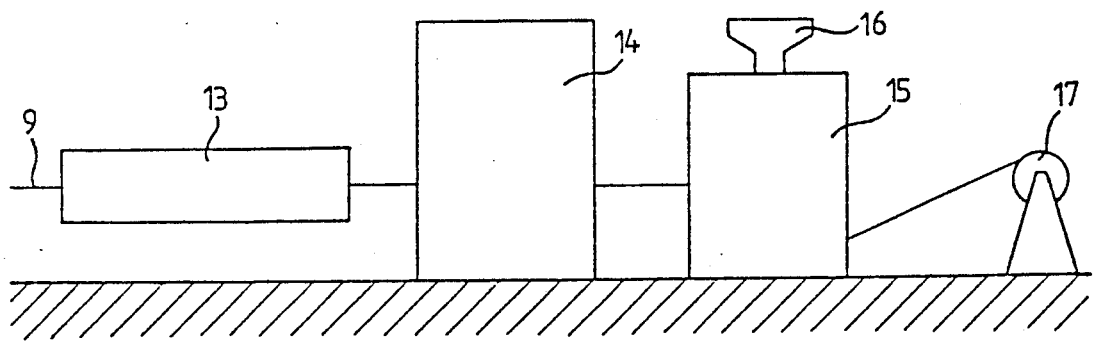

The sheetlike product can also be passed from the drawing means 8 directly into a furnace 13 (FIG. 1C) to be heated therein, whereafter it is led through a cooling means 14 into a coating means 15 to be coated e.g. by butyl rubber or some other filling material from a hopper 16 depending on the intended use. Thereafter it can be wound on a user reel 17. The product can be freely laminated if required By way of comparison, it may be mentioned that when the thickness of the product is 1.5 mm, the longitudinal shrinking is about 60%, the other parameters being as defined above.

With a smaller calibration gauge diameter (inner diameter=52 mm, the blow ratio being 1.0), the transverse shrinking is about 15%.

When ethylene plastic HDPE (density 0.955 g/cm$^3$, SI/21.6 kg=10) was used as raw material, the shrinking was decreased about 10%.

As is obvious, it is possible to obtain products as desired by varying the parameters. The product is at its best when its width is in the range from 50 to 300 mm and the thickness from 0.5 to 2.5 mm. In practice, 1,500 mm and 10 mm can be regarded as extreme values.

Figure 4:
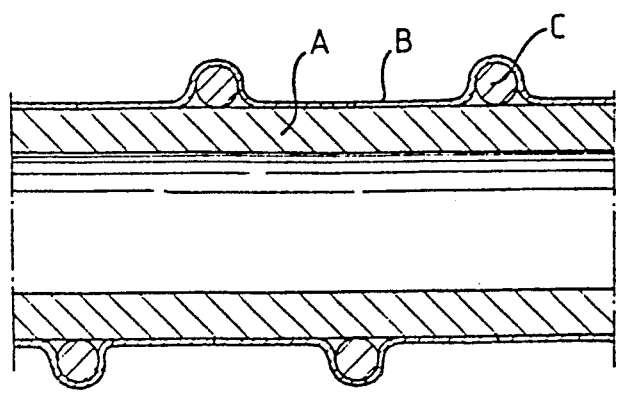
FIG. 4 illustrates one possible use of a product produced by the method.
Figure 2:
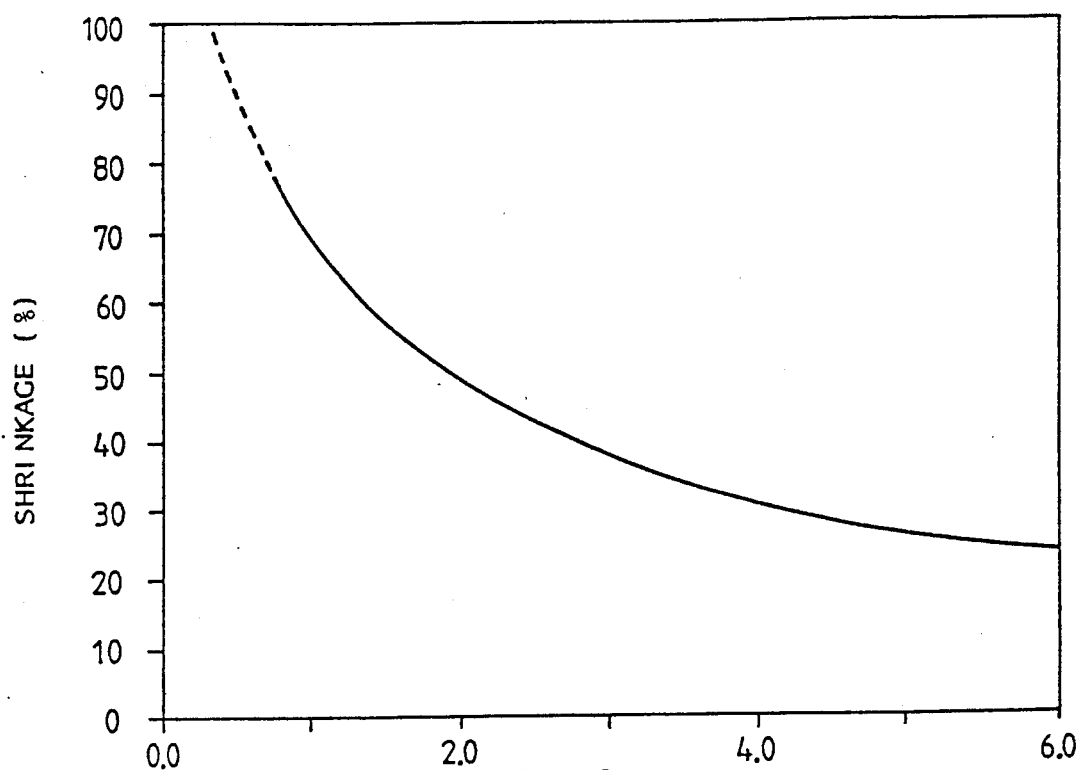
FIG. 2 illustrates graphically the dependence between shrinkage-% and wall thickness, referring to the preceding figure.
Figure 3:
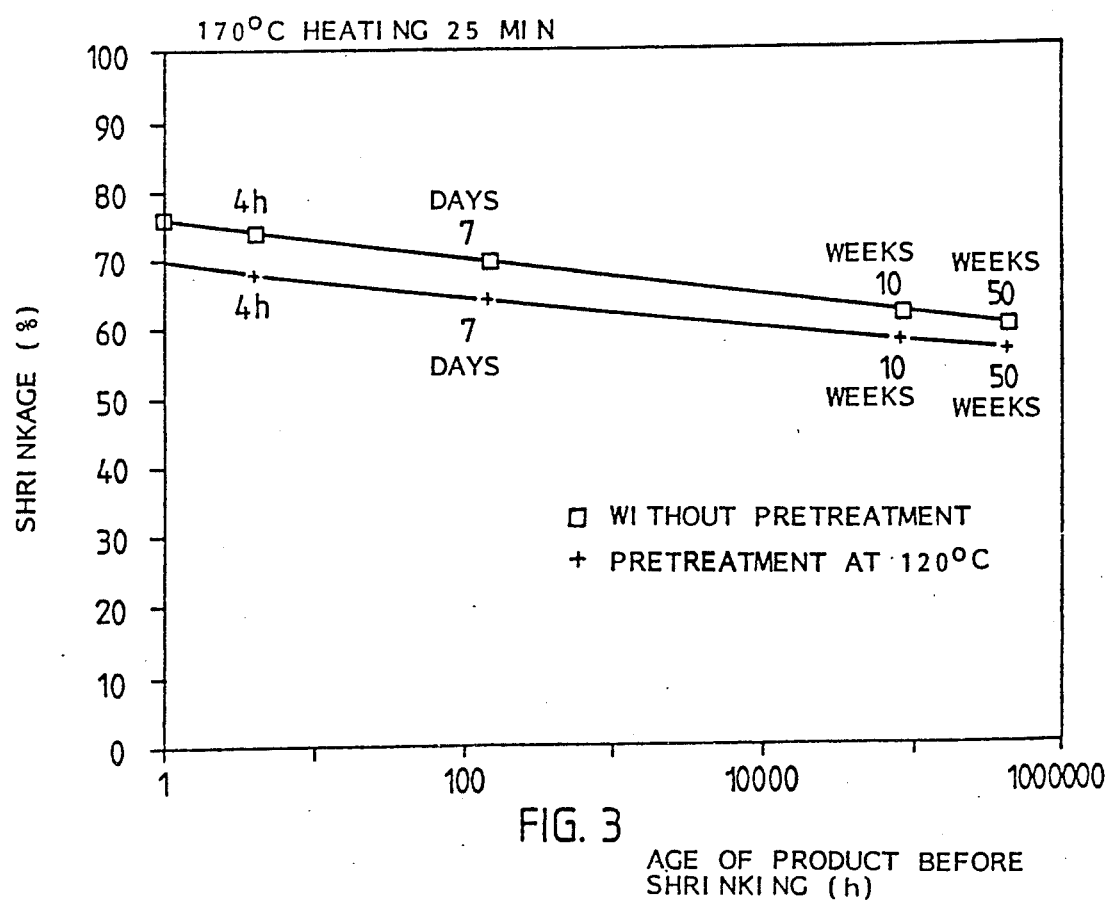
FIG. 3 illustrates graphically the dependence of the shrinkage-% upon time.

The advantageous effect of the transverse stresses caused by the tubular form can be illustrated e.g. by the case shown in FIG. 4. A stiffening/reinforcing pipe C is wrapped around a body pipe A. When a product B produced by the present method is wrapped around the stiffening/reinforcing pipe, it is pressed tightly around the assembly due to its longitudinal shrinking; it encloses the stiffening/reinforcing pipe also due to the remaining transverse stresses; and fuses to form a firm joint.

Figure 5:
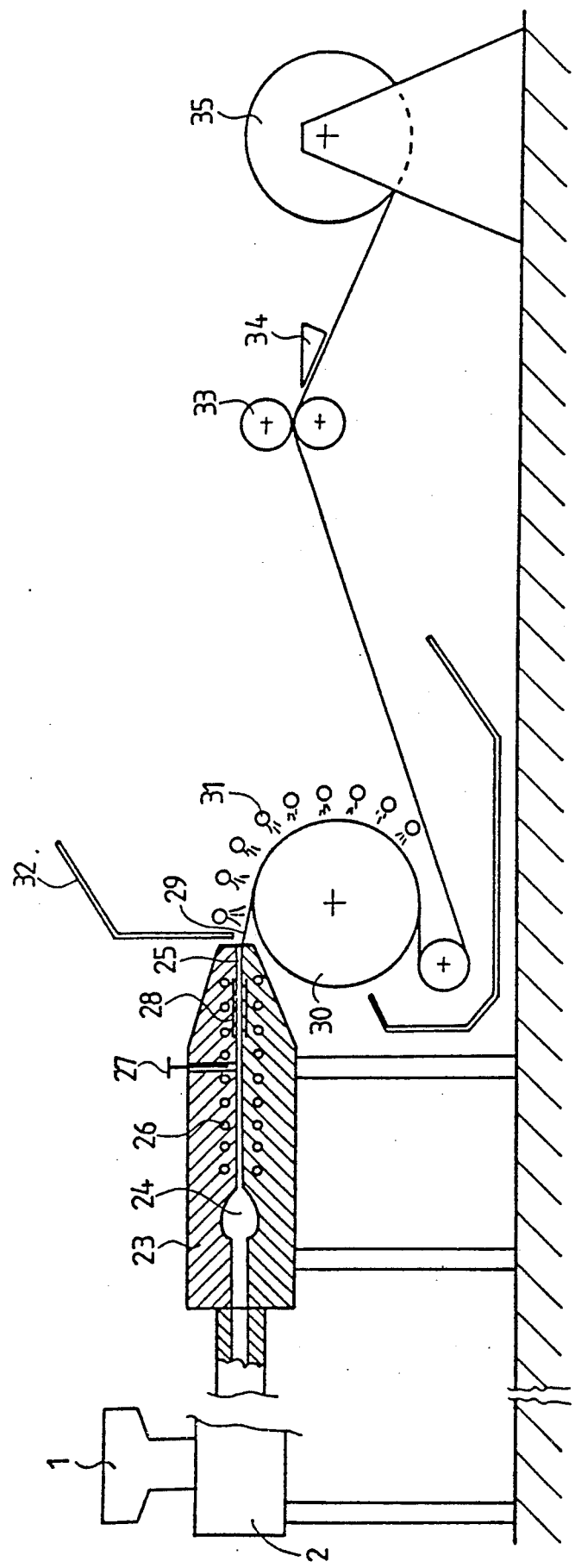
FIG. 5 illustrates an arrangement for applying the method when a flat die is used.

In FIG. 5, the raw material 1 is introduced into the screw extruder 2 (screw speed=50/min, diameter meter D=75 mm, L/D=30, running temperature in the screw cylinder preferably ranging from 130° to 230° C., temperature at the die preferably 190° C.), wherefrom the thoroughly plasticized molten plastic material is fed evenly into a feed space 24 of a flat die 23. The width of the die slot 25 is 900 mm and the height is adjustable in the range from 1.5 to 20 mm, preferably 1.6 mm. In the die slot, which is longer than usual, the plastic substance is cooled to about 145° to 160° C., that is, to a temperature exceeding the crystallization point of each particular raw material, in this case 136° C. In this way, an excessive pressure is avoided so that the production rate does not drop and no plugging occurs. In this particular case the production rate is about 72 kg/h, the sheet speed about 1.7 m/min and the average rate of shear of the plastic substance in the die about 54/s.

The above-mentioned cooling step can be carried out rapidly by means of blowing air and/or cooling channels 26 provided in the flat die 23. Water or oil, for instance, can be circulated in the channels. Local variations in the thickness of the plastic substance are adjustable by means of a preset throttle 27. During the process itself the adjustment, however, is carried out by means of heating resistors 28 provided in connection with the die slot 25. The heating resistors can be controlled e g. by means of a microprocessor-measuring sensor connection.

On emerging from the flat die the molten plastic sheet 29 with longitudinally oriented molecules is passed about a cold receiving roll 30 positioned as close to the flat die 23 as possible (the temperature of the roll being e.g. 6° C.) The plastic sheet is further passed from between drawing rolls 33, preferably rubber-coated, on to a reel 35. The edges of the plastic sheet 29 are cut by means of a cutter 34 positioned after the drawing rolls 33.

The draw rate, which should not to any greater degree exceed the rate at which the plastic substance emerges from the flat die 23, may also be adjusted by means of a magnetic brake positioned in connection with the receiving roll. Thereby it is also easier to control the cooling contact between the plastic sheet and the receiving roll 30. Furthermore, the cooling can be made more efficient by means of cooling jets 31 positioned in connection with the receiving roll 30, e.g., by means of water jets and/or by decreasing the temperature of the receiving roll from the value mentioned above (e.g. to −20° C.).

It is also possible to use a laminate die for the production of a multi-layer or coated product. A sheetlike product, both simple and laminate, can be manufactured in the width of 3.5 m and in the thickness of 0.1 to 7 mm, preferred values being 0.1 to 1 m and 0.3 to 2 mm.

The above examples are only intended to illustrate the basic idea of the invention. Suitable raw materials include ABS, PS, PB, PP and PA plastics. Polypropylenes are of particular interest for their special properties and transparency. Even though the annular and flat die only are dealt with above, it is likewise possible to use other profile dies. In its details, the method according to the invention may vary within the scope of the attached claims.

I claim:

1. A method of producing a shrinkable product of an orientable thermoplastic raw material by extrusion, comprising the steps of extruding molten orientable plastic raw material through a die at such a low speed that the flow stays laminar, while keeping the walls of the die at as low a temperature as possible without plugging thereby to improve the adhesion of the material to said walls so as to keep the speed of the material as close to zero as possible along said walls, thus obtaining an orientation of the molecules which is longitudinal in the extrusion direction, and quenching the plastic material after extrusion so that the longitudinal orientation of the molecules is maintained in a solidified state in the finished product.

2. A method according to claim 1, wherein the extrusion die (23) is a long, narrow slot die for stabilizing the laminar flow.

3. A method according to claim 2 wherein the extrusion die is a flat die (23).

4. A method according to claim 1 wherein the terminal portion of the die (3, 23) is cooled for increasing the adhesion forces.

5. A method according to claim 1 wherein the extrusion die is an annular die (3).

6. A method according to claim 5, wherein after extrusion the diameter of the substance emerging from the annular die (3) in an annular shape is altered, the blow ratio being in the range from 0.7 to 1.5.

7. A method according to claim 6, wherein stretching is carried out after extrusion, the draw ratio being in the range from 1 to 6.

8. A method according to claim 6, wherein a tubular product (18) is formed of the substance which is in a annular form.

9. A method according to claim 8, wherein the tubular product (18) is further cut into a sheet (9).

10. A method according to claim 9, wherein the sheet (9) is passed into a receiving means (8), whereafter it is wound on a reel (19, 17).

11. A method according to claim 10, wherein the sheet (9) is wound on a reel (12, 17) in such a manner that the surface thereof turned towards the inside of the reel is the surface which originally formed the outer surface of the pipe.

12. A method according to claim 11, wherein transverse stresses in the sheet (9) reduced by heat treatment, at about 110° to 130° C.

13. A method according to claim 3, wherein variations in the thickness of the substance emerging from the flat die (23) in planar form are compensated for by adjusting means (27, 28).

14. A method according to claim 13, wherein the substance emerging from the flat die (23) in planar form is passed about a cold receiving roll (30) for forming a sheet (29), whereafter it is wound on a reel (35).

15. A method according to claim 14, wherein the sheet (29) is wound on to the reel (35) via rolls (33) adjusting the draw rate.

* * * * *